United States Patent
Sakai

(10) Patent No.: US 9,678,330 B1
(45) Date of Patent: Jun. 13, 2017

(54) ELECTROWETTING DISPLAY DEVICE INCLUDING A TOP INTERNAL DIFFUSER

(71) Applicant: Amazon Technologies, Inc., Seattle, WA (US)

(72) Inventor: Toru Sakai, Waalre (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/972,733

(22) Filed: Dec. 17, 2015

(51) Int. Cl.
*G02B 26/00* (2006.01)
*G02B 5/02* (2006.01)

(52) U.S. Cl.
CPC ......... *G02B 26/005* (2013.01); *G02B 5/0226* (2013.01)

(58) Field of Classification Search
USPC ................................................. 359/290–296
See application file for complete search history.

(56) References Cited

U.S. PATENT DOCUMENTS

| | | | | |
|---|---|---|---|---|
| 9,297,998 B2* | 3/2016 | Novoselov | ............... | H01L 21/28 |
| 2009/0027760 A1* | 1/2009 | Wang | ................... | G02B 26/005 |
| | | | | 359/291 |
| 2010/0296150 A1* | 11/2010 | Hayes | .................. | G02B 26/004 |
| | | | | 359/290 |
| 2013/0106712 A1* | 5/2013 | Cummings | .......... | G02B 26/001 |
| | | | | 345/173 |

* cited by examiner

*Primary Examiner* — Mohammed Hasan
(74) *Attorney, Agent, or Firm* — Brinks Gilson & Lione

(57) ABSTRACT

A display device including a top support plate having a first refractive index. A diffusion layer on a first surface of the top support plate includes a plurality of features. Each feature of the plurality of features has a second refractive index greater than the first refractive index. A transparent conductive polymer layer is applied over the diffusion layer. The transparent conductive polymer layer has a third refractive index equal to the first refractive index, and provides a common electrode.

20 Claims, 7 Drawing Sheets

US 9,678,330 B1

ELECTROWETTING DISPLAY DEVICE INCLUDING A TOP INTERNAL DIFFUSER

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
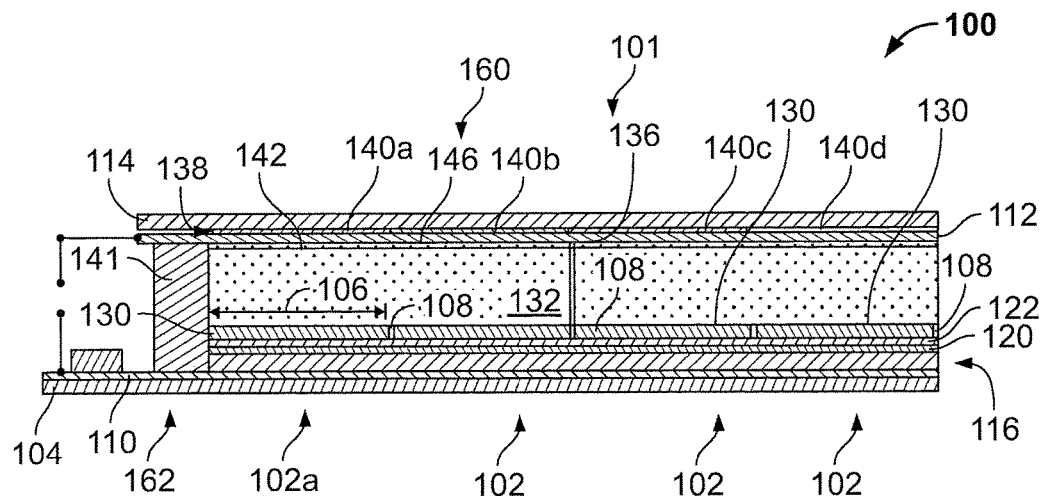
FIG. 1 is a cross-sectional view of the example electrowetting display device of FIG. 3 along sectional line 1-1, according to one embodiment.

In embodiments described herein, an electrowetting display device includes a patterned indium tin oxide (ITO) layer having a relatively high refractive index applied to an inner surface of a top support plate of the electrowetting display device to provide a top internal diffuser having a diffusing effect on light entering and exiting a pixel region of the electrowetting display device. The patterned ITO layer defines a plurality of ITO features on an inner surface of a top support plate. A conductive transparent material, e.g., a conductive polymer layer, is applied over the ITO features to provide a common electrode on the top support plate. The conductive polymer material has a refractive index the same or similar to a refractive index of the top support plate and a refractive index of the electrolyte fluid contained within the pixel region. In the example embodiments, the ITO layer has a refractive index greater than the refractive indices of the top support plate, the conductive polymer material and an electrolyte fluid.

In certain embodiments, a degree of light diffusion, a direction of light diffusion, and/or a transmittance of an internal diffuser can be controlled by tuning one or more parameters of the electrowetting display device. In the example embodiments, the diffusion layer features are a part of the conductive path in the transparent conductive material, resulting in a reduction of an overall resistance of an electrode on a top support plate. In various embodiments, a color filter plate includes a patterned ITO layer that defines a plurality of ITO features within the color filter.

In embodiments described herein, an electrowetting display device includes a reflective layer positioned under a pixel grid having a plurality of electrowetting pixels. Each electrowetting pixel is formed by one or more respective pixel walls to define a display surface area of the electrowetting pixel. The electrowetting pixels may have one or more specific and/or additional structural features. The reflective layer is positioned with respect to, e.g., within or under, each electrowetting pixel. In certain embodiments, the reflective layer may include one or specular reflectors and/or one or more diffuse reflectors positioned with respect to, e.g., within or under, each electrowetting pixel. In certain embodiments, the reflective layer includes one or more specular reflectors made of a suitable material including, without limitation, a suitable metal, alloy, doped metal, or dielectric reflector material. In certain embodiments, the reflective layer includes one or more diffuse reflectors made of a suitable diffuse reflective material, such as titanium dioxide ($TiO_2$), for example.

During operation of the electrowetting display device, light enters the electrowetting display device through a top support plate as a voltage source applies a voltage over the electrode layers, i.e., a first or pixel electrode and a second or common electrode to cause displacement of a fluid, such as a first fluid, contained within one or more electrowetting pixels. After entering the electrowetting display device through the top support plate, light travels through the common electrode including the ITO layer and the conductive polymer layer and is diffused. The diffused light continues to travel through the electrowetting pixel and impinges on the reflector layer positioned at or near a bottom of the electrowetting pixel. The light is reflected by the reflective layer and then travels out of the electrowetting display device through the top support plate. As described in greater detail below, a position, a configuration and/or one or more dimensions of each ITO feature formed in the ITO layer may be selected to optimize a performance of the electrowetting display device by adjusting the diffuse reflectance to provide a more paper-like appearance while maintaining a desired brightness level provided by the specular reflectance.

In general, the term "specular reflection" or "specular reflectance" refers to a mirror-like reflection of light from a surface in which light from a single incoming angle or direction (an incident ray) is reflected in a single outgoing angle or direction. In general, the term "diffuse reflection" or "diffuse reflectance" refers to the reflection of light from a surface in which an incident ray is reflected at more than one angle or direction, e.g., many angles or directions, rather than at only one angle or direction as in the case of specular reflection. In general, the term "refraction" refers to a change in direction of propagation of a light ray due to a change in its transmission medium. Due to change of medium, the phase velocity of the light ray is changed but its frequency remains constant. This is most commonly observed when a light ray passes from one medium to another medium at any angle other than 0° from the normal. For example, refraction of light occurs at the interface between the two media of different refractive indices, with $n_2 > n_1$. Because the phase velocity is lower in the second medium ($v_2 < v_1$), the angle of refraction $\theta_2$ is less than the angle of incidence $\theta_1$; that is, the ray in the higher-index medium is closer to the normal. In optics, refraction is a phenomenon that often occurs when light rays travel at an oblique angle from a medium with a first refractive index to a medium with a second refractive index different from the first refractive index, e.g., greater than the first refractive index. At the boundary between the media, the phase velocity of the light ray is altered, usually causing a change in direction.

In various embodiments described herein, electronic devices include electrowetting displays for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

An electrowetting pixel is defined by one or more pixel walls that surround or are otherwise associated with at least a portion of the electrowetting pixel. The pixel walls form a structure that is configured to contain at least a portion of a first fluid, e.g., a liquid such as an opaque oil. Light transmission through the electrowetting pixel is controlled by the application of an electric potential to the electrowetting pixel, which results in a movement of a second fluid, e.g., a liquid such as an electrolyte solution, into the electrowetting pixel, thereby displacing the first fluid.

When the electrowetting pixel is in an off state (i.e., with no electric potential applied), the first fluid, e.g., the opaque oil, is distributed throughout the electrowetting pixel to substantially cover the display surface area of the electrowetting pixel. The first fluid absorbs light and the electrowetting pixel in this condition appears black in one embodiment. But when the electric potential is applied, the electrowetting pixel is in an on state and the first fluid is displaced to one or more sides of the electrowetting pixel, for example. Light can then enter the electrowetting pixel and impinge upon a surface of the reflective layer positioned at or near a bottom surface of the electrowetting pixel. The light is then reflected by the reflective layer and reflects out of the electrowetting pixel, causing the electrowetting pixel to appear bright, e.g., white, to an observer. If the one or more reflective surfaces reflect only a portion of the light spectrum or if color filters are incorporated into the electrowetting pixel structure, the electrowetting pixel may appear to have color.

A display device, such as an electrowetting display device, may include a transmissive, reflective or transflective display that generally includes an array of pixels (e.g., which may comprise sub-pixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) included in each pixel. Transistors occupy a relatively small fraction of the area of each pixel to allow light to efficiently pass through (or reflect from) the pixel. In certain embodiments, a pixel includes two or more sub-pixels of an electrowetting display device. Such a pixel or sub-pixel may be the smallest light transmissive, reflective or transflective pixel of a display that is individually operable to directly control an amount of light transmission through or reflection from the pixel. For example, in some embodiments, a pixel may include a red sub-pixel, a green sub-pixel, a blue sub-pixel, and a white sub-pixel for RGBW displays. In other embodiments, a pixel may be a smallest component, e.g., the pixel does not include any sub-pixels.

The array of pixels is sandwiched between two support plates, such as a bottom support plate and an opposing top support plate. For example, a bottom support plate in cooperation with a top support plate may contain pixels that include electrowetting oil, electrolyte fluid or solution and pixel walls between the support plates. The support plates may be made of any suitable material including, without limitation, glass, plastic, or other transparent materials, and may be made of a rigid material or a flexible material, for example. Pixels include various layers of materials built upon the bottom support plate. One example layer is an amorphous fluoropolymer (AF1600®) with hydrophobic behavior. The pixel walls may be formed on a top surface of the hydrophobic layer, or, alternatively, may be formed before the hydrophobic layer is deposited, for example. The bottom support plate may be opaque while the top support plate is transparent. Describing a pixel or material as being "transparent" generally means that the pixel or the material may transmit a relatively large fraction of the light incident upon it. For example, a transparent material or a layer might transmit more than 70% or 80% of the light impinging on its surface, although in other examples a transparent material or structure might transmit a different percentage of incident light. In general, transparent materials or structures need not be perfectly transparent.

Hereinafter, example embodiments include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the surface through which pixels of a (reflective) electrowetting display are viewed.

As described above, individual reflective electrowetting pixels may include an electrode layer containing the drive electronics like TFTs, source lines, and gate lines on the bottom support plate, a reflective layer adjacent to or on the electrode layer, a pixel electrode on the reflective layer, a barrier layer on the reflective layer, and a hydrophobic layer on the barrier layer. The reflector layer itself can act both as the pixel electrode and the reflector layer or an additional pixel electrode, e.g., an ITO, can be deposited on the reflector layer. The pixel electrode in principle is close to the fluids in the pixel to minimize power consumption. In one embodiment, the pixel electrode is deposited over the reflective layer. In an alternative embodiment, the pixel electrode is under the reflective layer. The electrode layer as shown, for example, in FIGS. 1, 2, and 4 can be an electrode layer containing the drive electronics if the reflective layer is used as the electrode or the electrode layer can contain the pixel electrodes in contact with the reflective layer. Pixel walls of each pixel, the hydrophobic layer, and the transparent top support plate at least partially enclose a fluid region within the cavity that includes the first fluid which is electrically non-conductive, e.g., an opaque oil, retained in the individual electrowetting pixels by pixel walls, and the second fluid, e.g., an electrolyte fluid or solution, that is electrically conductive or polar and may be a water or a salt solution, such as a solution of potassium chloride in water. The second fluid may be transparent, but may be colored, or light-absorbing. The second fluid is immiscible with the first fluid. In general, substances are immiscible with one another if the substances do not substantially form a solution, although in a particular embodiment the second fluid might not be perfectly immiscible with the first fluid. In general, an "opaque" fluid is a fluid that appears black to an observer. For example, an opaque fluid strongly absorbs a broad spectrum of wavelengths (e.g., including those of red, green and blue light) in the visible region of electromagnetic radiation appearing black. However, in certain embodiments an opaque fluid may absorb a relatively narrower spectrum of wavelengths in the visible region of electromagnetic radiation and may not appear perfectly black. In example embodiments, each of the first fluid and the second fluid is a liquid.

In some embodiments, the opaque fluid is a nonpolar electrowetting oil. In certain embodiments, the first fluid may absorb at least a portion of the visible light spectrum. The first fluid may be transmissive for a portion of the visible light spectrum, forming a color filter. For this purpose, the first fluid may be colored by addition of pigment particles or a dye. Alternatively, the first fluid may be black, for example by absorbing substantially all portions of the visible light spectrum, or reflecting. A reflective first fluid may reflect the entire visible light spectrum, making the layer appear white, or a portion of the entire visible light spectrum, making the layer have a color. In example embodiments, the first fluid is black and, therefore, absorbs substantially all portions of an optical light spectrum.

Spacers and edge seals mechanically connect the first support plate with the overlying, opposing second support plate, or form a separation between the first support plate and the second support plate, to contribute to the mechanical integrity of the electrowetting display device. Edge seals, for example, disposed along a periphery of an array of electrowetting pixels, may contribute to retaining fluids (e.g., the first fluid and the second fluid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels of the electrowetting display device based, at least in part, on electronic signals representative of a static image and/or video data. The code may cause the processor to modulate the optical properties of pixels by controlling electrical signals (e.g., voltages, currents, and fields) on, over, and/or in layers of the electrowetting display device.

Figure 2:
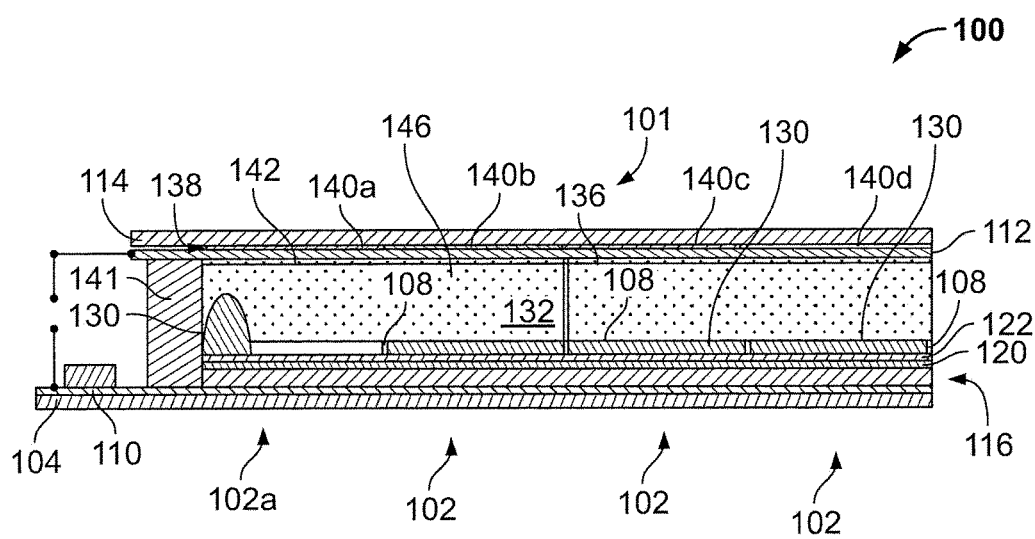
FIG. 2 is a cross-sectional view of the electrowetting display device of FIG. 3 along sectional line 1-1 with a first pixel activated to expose at least a portion of a display area including a reflective layer.
Figure 3:
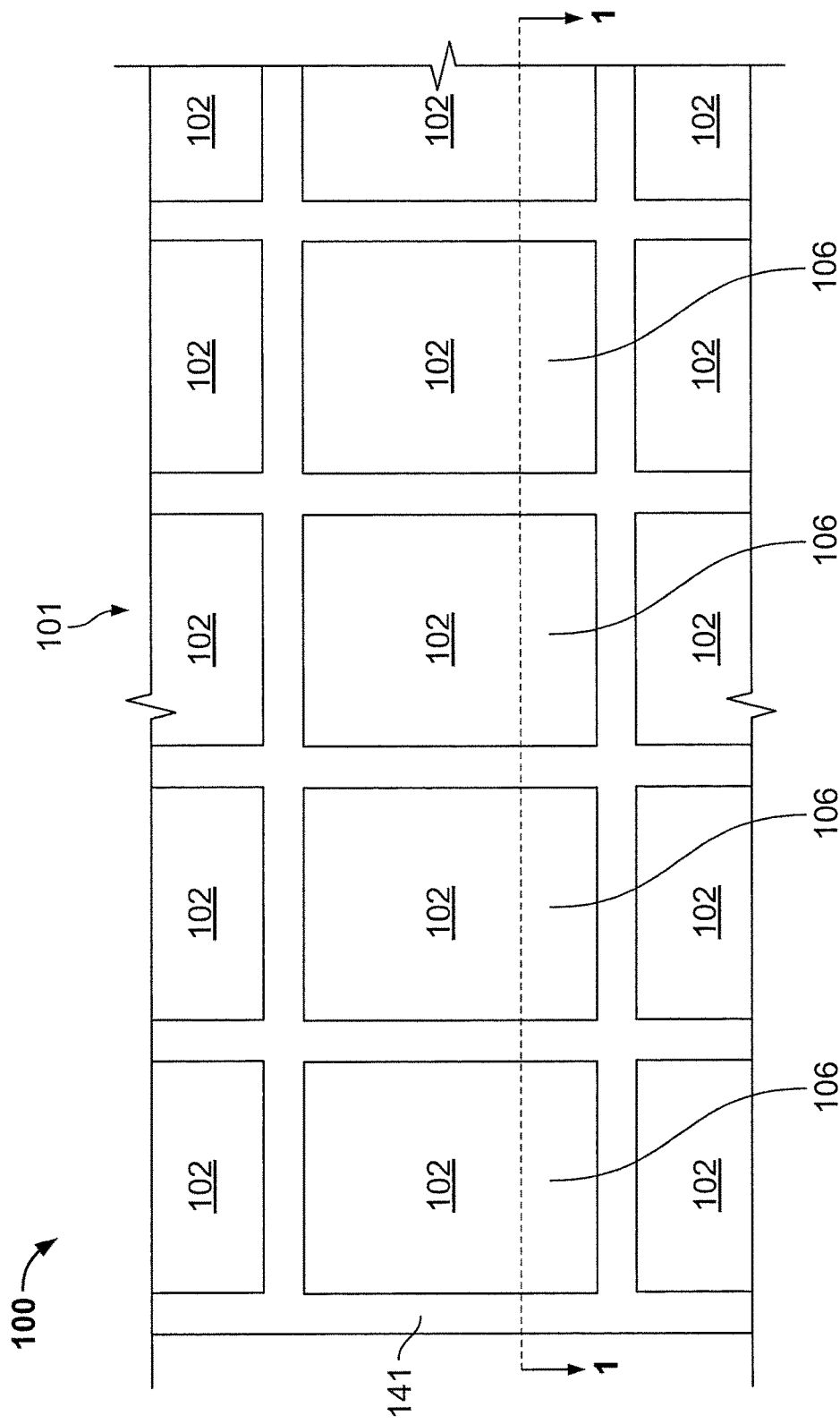
FIG. 3 is a top view of a plurality of electrowetting pixels of an example electrowetting display device.

Referring now to the figures, FIG. 1 is a cross-sectional view of a portion of an example reflective electrowetting display device 100 including a pixel region having a pixel grid 101 with several electrowetting pixels 102 taken along a sectional line 1-1 of FIG. 3. FIG. 2 shows the same cross-sectional view as FIG. 1 in which an electric potential has been applied to one electrowetting pixel 102a causing displacement of a first fluid disposed therein, as described below. Four complete electrowetting pixels 102 are shown in cross-section in FIGS. 1 and 2. FIG. 3 is a top view of example reflective electrowetting display device 100 including pixel grid 101 having a plurality of electrowetting pixels 102 formed over a first or bottom support plate 104 (shown in FIGS. 1 and 2). As shown in FIG. 3, each electrowetting pixel 102 defines a display surface area 106. More specifically, in this embodiment, display surface area 106 is defined by pixel walls 108, as described below, having a first dimension, such as a width, between opposing lateral pixel walls 108, and a second dimension, such as a length, between the remaining opposing pixel walls 108. Electrowetting display device 100 may include any number (usually a very large number, such as thousands or millions) of electrowetting pixels 102.

Referring further to FIGS. 1 and 2, an electrode layer 110 having a plurality of pixel electrodes is formed on bottom support plate 104 and between electrowetting pixels 102 and bottom support plate 104. Electrode layer 110 and/or the one or more pixel electrodes are operatively coupled to a second or common electrode 112 positioned under a second or top support plate 114 for creating, in conjunction with common electrode 112, a voltage differential between electrode layer 110 and common electrode 112 to cause relative displacement of a first fluid, e.g., an oil, and a second fluid, e.g., an electrolyte fluid, within the electrowetting pixel region. These example embodiments are not limiting with respect to the location of the first and second electrode, and claimed subject matter is not limited in this respect. In particular embodiments, one or more additional layers may be positioned between electrode layer 110 and bottom support plate 104, in which TFTs, gates, and/or source lines are located, for example. In these embodiments, electrode layer 110 may not be formed directly on bottom support plate 104. In various embodiments, electrode layer 110 may be connected to any number of transistors, such as suitable thin film transistors (TFTs) (not shown), that are switched to either select or deselect corresponding electrowetting pixels 102 using active matrix addressing, for example. A TFT is a particular type of field-effect transistor that includes thin films of an active semiconductor layer as well as a dielectric layer and metallic contacts over a supporting (but non-conducting) substrate, which may be glass or any suitable transparent or non-transparent material, for example.

A reflective layer 116 is positioned adjacent, e.g., on electrode layer 110, as shown in FIGS. 1 and 2, for example. In particular embodiments, one or more additional layers may be positioned between reflective layer 116 and electrode layer 110. In these embodiments, reflective layer 116 may not be formed directly on electrode layer 110. In an alternative embodiment, reflective layer 116 is positioned under a transparent electrode layer. In this alternative embodiment, reflective layer 116 is positioned between the transparent electrode layer 110 and bottom support plate 104. Reflective layer 116 may reflect light within the entire visible spectrum, making the layer appear relatively bright, or reflect a portion of light within the visible spectrum, making the layer have a color. In this embodiment, reflective layer 116 is positioned within the pixel region, e.g., within each electrowetting pixel 102, to provide specular reflection.

As shown in FIGS. 1 and 2, in the example embodiment, reflective layer 116 is positioned on electrode layer 110 within electrowetting pixel 102. In alternative embodiments, reflective layer 116 is position on electrode layer 110 and under electrowetting pixel 102. In certain embodiments, reflective layer 116 is formed or made of any suitable materials including, for example, a metal (90%, 95% or greater than 95% metal), an alloy, a doped metal, or a dielectric reflector material. Suitable metal materials for reflective layer 116 include, without limitation, aluminum, silver, gold, copper, nickel, platinum, rhodium, lanthanum, and/or silicon nickel. Suitable alloy materials for reflective layer 116 include, without limitation, aluminum with copper or aluminum with nickel. In further alternative embodiments, reflective layer 116 is made of any suitable material providing a desired specular reflectance. In alternative embodiments, reflective layer includes a suitable diffuse reflective material deposited on or over electrode layer 110. In this alternative embodiment, any suitable diffuse reflective material, such as titanium dioxide ($TiO_2$), providing a desired diffuse reflectance may be used.

Electrowetting pixels 102 may have specific and/or additional structural features. Additionally or alternatively, reflective layer 116 may have structural features, for example, one or more relatively thinner areas and/or one or more relatively thicker areas within reflective layer 116 to control movement of the fluids. Alternatively, reflective layer 116 may be deposited on a structural feature conforming to a shape of the structural feature.

A suitable dielectric barrier layer 120 may at least partially separate electrode layer 110 from a hydrophobic layer 122, such as an amorphous fluoropolymer layer forming a bottom surface of electrowetting pixel 102. For example, dielectric barrier layer 120 in certain embodiments is deposited on reflective layer 116. Dielectric barrier layer 120 may be formed from various materials including one or more organic material layers or a combination of organic and inorganic material layers. A thickness of the insulating dielectric barrier layer 120 may be less than 2 micrometers and may be less than 1 micrometer; for example, the insulating dielectric barrier layer 120 may be 100 nanometers to 800 nanometers in thickness in certain embodiments. In some embodiments, hydrophobic layer 122 is an amorphous fluoropolymer layer including any suitable fluoropolymer(s), such as AF1600®, produced by DuPont, based in Wilmington, Del. Hydrophobic layer 122 is transparent in the example embodiment. Reflective layer 116 below hydrophobic layer 122 may reflect light within the entire visible spectrum, making the layer appear white, or reflect a portion of light within the visible spectrum, making the layer have a color. As described above, in certain embodiments reflector layer 116 itself can act both as a pixel electrode and a reflector layer.

In the example embodiment, a plurality of pixel walls 108 form patterned electrowetting pixel grid 101 on hydrophobic layer 122. Pixel walls 108 may include a photoresist material such as, for example, epoxy-based negative photoresist SU-8. Patterned electrowetting pixel grid 101 includes a plurality of rows and a plurality of columns that form an array of electrowetting pixels, such as shown in FIG. 3, including a plurality of electrowetting pixels 102 that may have a width and a length in a range of about 50 to 500 micrometers, for example.

A first fluid 130, which may have a thickness (e.g., a height as shown in FIGS. 1 and 2 for example) in a range of about 1 to 10 micrometers, for example, overlays hydrophobic layer 122. First fluid 130 is partitioned by pixel walls 108 of patterned electrowetting pixel grid 101. A second fluid 132, such as an electrolyte solution, overlays first fluid 130 and pixel walls 108 of patterned electrowetting pixel grid 101. In certain embodiments, as described above, second fluid 132 may be electrically conductive and/or polar. For example, second fluid 132 may be water or a water solution, or a salt solution such as a solution of potassium chloride in water or a mixture of water and ethyl alcohol. In certain embodiments, second fluid 132 is transparent, but may be colored or absorbing. First fluid 130 is electrically non-conductive and may for example be an alkane like hexadecane or (silicone) oil. As described above, first fluid 130 is immiscible with second fluid 132.

As described above, hydrophobic layer 122 is arranged on bottom support plate 104 to create an electrowetting surface area. The hydrophobic character of hydrophobic layer 122 causes first fluid 130 to adjoin preferentially to hydrophobic layer 122 because first fluid 130 has a higher wettability with respect to a top surface of hydrophobic layer 122 than second fluid 132 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

Top support plate 114 covers second fluid 132 and one or more spacers 136 to maintain second fluid 132 over electrowetting pixel grid 101. In one embodiment, spacer 136 extends from top support plate 114 and may rest upon a top surface of one or more pixel walls 108. In alternative embodiments, spacer 136 does not rest on pixel wall 108 but is substantially aligned with pixel wall 108. This arrangement may allow spacer 136 to come into contact with pixel wall 108 upon a sufficient pressure or force being applied to top support plate 114. Multiple spacers 136 may be interspersed throughout electrowetting pixel grid 101. In certain embodiments, one or more filter layers 138 including, for example, color filters 140a-140d as shown in FIGS. 1 and 2, may be positioned between second electrode 112 and top support plate 114. A seal 141 extends about a perimeter of electrowetting display device 100 to contain first fluid 130 and second fluid 132 within the fluid region of the cavity. A voltage applied across, among other things, second fluid 132 and electrode layer 110 of individual electrowetting pixels 102 may control transmittance or reflectance of the individual electrowetting pixels 102.

Figure 4:
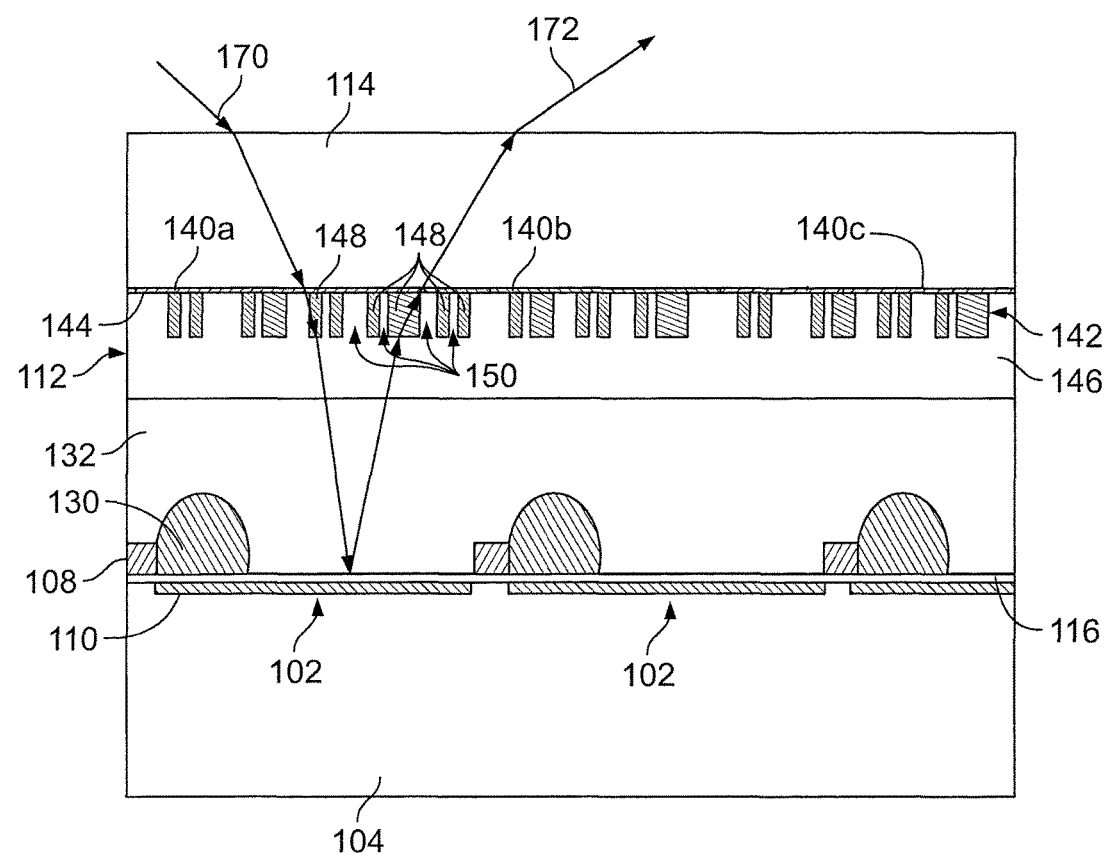
FIG. 4 is a partial cross-sectional view of the electrowetting display device of FIG. 3 along sectional line 1-1, according to one embodiment.

Referring further to FIG. 4, in the example embodiment, a diffusion layer 142 is positioned within the electrowetting pixel region to provide additional diffusion of light entering and exiting electrowetting display device 100 as desired. More specifically, diffusion layer 142 is applied to, e.g., deposited on, a first or inner surface 144 of top support plate 114 and a transparent conductive layer, e.g., a conductive polymer layer 146, is applied over, e.g., deposited on, diffusion layer 142 to provide common electrode 112. In the example embodiment, color filter layer 138 is positioned between top support plate 114 and diffusion layer 142. More specifically, a first surface of color filter layer 142 contacts a first or inner surface of top support plate 142 and a second surface of color filter layer 138, opposite the first surface, contacts a first surface of diffusion layer 142. Diffusion layer 142 may include any suitable diffusion material, such as ITO, for example. In example embodiments, a conductivity of conductive polymer layer 146 can be adjusted based on a selection of a type of polymer backbone, e.g., polyacetylene (PAC), polypyrrole (PPY), polythiophene (PT) and polyanilines (PANT), in combination with doping materials. For example, suitable polymer materials for forming conductive polymer layer 146 include, without limitation polyacetylene, polypyrrole, polythiophene, poly(3-alkylthiophene), polyphenylene sulfide, polyphenylenevinylene, polythienylenevinylene, polyphenylene, polyisothianaphthene, polyazulene, polyfuran, or polyaniline. Further, in an example embodiment, conductive polymer layer 146 has a refractive index of 1.5. As shown in FIG. 4, conductive polymer layer 146 providing at least a portion of common electrode 112 contacts second fluid 132 contained within the electrowetting pixel region, e.g., electrowetting pixel 102. As described herein, a thickness of conductive polymer layer 146 is determined by a feature size within diffusion layer 142; generally, the feature size is between 0.5 micrometers and 3.0 micrometers.

In the example embodiment, top support plate 114 has a first refractive index, diffusion layer 142 has a second refractive index greater than the first refractive index of top support plate 114, and conductive polymer layer has a third refractive index equal to the first refractive index. In certain embodiments, top support plate 114 comprises a material having the first refractive index of 1.4 to 1.6, and, in particular embodiments, a first refractive index of 1.5; diffusion layer 142 comprises a material having the second refractive index equal to or greater than 1.5, and, in particular embodiments, between 1.5 to 2.5; and conductive polymer layer 146 comprises a material having the third refractive index of 1.4 to 1.6, and, in particular embodiments, a third refractive index of 1.5. In certain embodiments, top support plate 114 comprises a material having the first refractive index of less than 2.0, diffusion layer 142 comprises a material having the second refractive index of at least 2.0, and conductive polymer layer 146 comprises a material having the third refractive index of less than 2.0. For example, in the example embodiment, top support plate 114 is made of a glass material having the first refractive index of 1.5, diffusion layer 142 is made of ITO having the second refractive index of 2.0, and conductive polymer layer 146 is made of a suitable polymer material having the third refractive index of 1.5. Further, in certain embodiments, second fluid 132, e.g., the electrolyte solution, has a fourth refractive index equal to or substantially similar to the first refractive index and the third refractive index. For example, in the example embodiment, second fluid 132 has a fourth refractive index of 1.45.

In the example embodiment, diffusion layer 142 has a thickness of 0.1 micrometers to 2.0 micrometers and, more particularly, a thickness of about 100 nanometers to about 300 nanometers, and conductive polymer layer 146 has a thickness of 0.5 micrometers to 3.0 micrometers and, more particularly, a thickness of about 1.0 micrometers to about 2.0 micrometers. In certain embodiments, diffusion layer 142 is patterned using a suitable patterning technique, such as described herein, to form a plurality of features 148. Each feature 148 is separated by a distance from adjacent features of the plurality of features. As shown in FIG. in FIG. 4, features 148 are separated by voids 150 defined through diffusion layer 142. For example, in this embodiment, diffusion layer 142 includes a patterned indium tin oxide (ITO) layer forming the plurality of features 148 separated by the plurality of voids 150 defined through diffusion layer 142. The indium tin oxide (ITO) layer forming diffusion layer 142 has the second refractive index of 2.0.

As described in greater detail below, in certain embodiments, features 148 can be placed randomly, e.g., without a predetermined pattern and/or predetermined distribution or density, on a glass top support plate 114, for example, and conductive polymer layer 146, having a refractive index the same or similar to the refractive indices of glass top support plate 114 and first fluid 132, is applied over diffusion layer 142 to provide internal diffusion. Moreover, one or more parameters of the plurality of features including, without limitation, a shape of each feature, one or more dimensions of each feature in a plane of the diffusion layer, and/or a distribution or a density of the plurality of features within the diffusion layer are tuned to provide a predetermined diffusion characteristic of diffusion layer 142. In certain embodiments, for example, within each electrowetting pixel 102, diffusion layer 142 has a distribution of features greater than 10%, and, more particularly, greater than 70%, and, even more particularly, greater than 80%. In example embodiments, an average feature width is 5 micrometers to 20 micrometers and a density of features in diffusion layer 142 is $5 \times 10^3$/millimeter (mm)$^2$ to $40 \times 10^3$/mm$^2$. Features 148 can be positioned either randomly or in order, e.g., patterned in a predetermined pattern, within diffusion layer 142. The average feature width and the distribution or density of features in diffusion layer 142 may change depending on the application. As a result, a degree of light diffusion within the electrowetting pixel region, e.g., within electrowetting pixel 102 or exiting electrowetting pixel 102, a direction of light diffusion, and/or a transmittance of an internal diffuser can be controlled by tuning one or more parameters of features 148 and voids 150. For example, a shape of features 148, e.g., a circular, square, hexagonal or other suitable polygonal shape, one or more dimensions of features 148, e.g., a width and/or a length of feature 148 in a plane of diffusion layer 142, and/or a density of features 148 within diffusion layer 142 can be tuned to predicatively control the diffusion characteristics of diffusion layer 142 and conductive polymer layer 146.

Additionally or alternatively, a thickness of diffusion layer 142, e.g., a thickness of the ITO layer, and/or a thickness of conductive polymer layer 146, a layout of features 148 in diffusion layer 142, e.g., a parallel, zigzag or chevron layout, and/or a pitch of a sidewall of features 148 can be tuned to predicatively control the diffusion characteristics of diffusion layer 142 and conductive polymer layer 146. Because features 148 of diffusion layer 142 become part of a conductive path in conductive polymer layer 146, a reduction of an overall resistance of common electrode 112 on top support plate 114 is achieved.

Reflective electrowetting display device 100 has a viewing side 160 corresponding to top support plate 114 through which an image formed by reflective electrowetting display device 100 may be viewed, and an opposing rear side 162 corresponding to bottom support plate 104 as shown, for example, in FIGS. 1 and 2. Reflective electrowetting display device 100 may be a segmented display type in which the image is built of segments. The segments may be switched simultaneously or separately. Each segment includes one electrowetting pixel 102 or a number of electrowetting pixels 102 that may be neighboring or distant from one another. Electrowetting pixels 102 included in one segment are switched simultaneously, for example. Electrowetting display device 100 may also be an active matrix driven display type or a passive matrix driven display, for example.

Referring further to FIG. 4, with an electric potential applied to electrowetting pixel 102 causing displacement of first fluid 130 disposed within electrowetting pixel 102, light entering electrowetting display device 100 travels through electrowetting pixel 102 and impinges upon reflective layer 116. More specifically, an example incident light ray, such as light ray 170, is refracted as it enters top support plate 114 and propagates through top support plate 114. At an interface of diffusion layer 146 with top support plate 114, light ray 170 is refracted again as it enters feature 148. Light ray 170 propagates through feature 148 and is refracted again as it propagates into conductive polymer layer 146. Light ray 170 travels through conductive polymer layer 146 and second fluid 132 and impinges on reflective layer 116 at a single incoming angle or direction. Light ray 170 is reflected by a surface of reflective layer 116 in a single mirror-like outgoing angle or direction as an example light ray 172. Light ray 172 propagates through second fluid 132 and conductive polymer layer 146. As light ray 172 enters feature 148, it is refracted and propagates through feature 148 into top support plate 114, where it is refracted again. Light ray 172 propagates through top support plate 114 and as it exits top support plate 114, light ray 172 is refracted once more.

Desired optical performance, such as an optimization of brightness and diffusion characteristics of electrowetting display device 100, can be achieved through reflective layer and/or diffusion layer design. For example, adjusting a number and/or a configuration of features 148 within diffusion layer 142 can achieve such desired optical performance.

In one embodiment, an electrowetting display device includes a first or bottom support plate and a second or top support plate. The second support plate has a first refractive index. An electrowetting pixel region, e.g., an electrowetting pixel, is positioned between the first support plate and the second support plate. A reflective layer is positioned on the first support plate within the electrowetting pixel. An oil and an electrolyte fluid that is immiscible with the oil are contained in the electrowetting pixel. A diffusion layer is applied, e.g., deposited, on a first or inner surface of the second support plate. The diffusion layer includes an indium tin oxide (ITO) layer forming a plurality of features. Each feature of the plurality of features has a second refractive index greater than the first refractive index. A conductive polymer layer is applied, e.g., deposited, over the diffusion layer. The conductive polymer layer has a third refractive index equal to the first refractive index. The conductive polymer layer provides a common electrode contacting the electrolyte fluid. An electrode layer is positioned over the first support plate. The electrode layer or pixel electrode is coupled to the common electrode for creating, in conjunction with the common electrode, a voltage differential between the electrode layer and the common electrode to cause relative displacement of the oil and the electrolyte fluid to expose at least a portion of the reflective layer. In a particular embodiment, the diffusion layer includes a patterned indium tin oxide (ITO) layer forming the plurality of features separated by a plurality of voids defined through the diffusion layer.

In one embodiment, a display device includes a top support plate having a first refractive index. A diffusion layer is on a first or inner surface of the top support plate. The diffusion layer includes a plurality of features. Each feature of the plurality of features has a second refractive index greater than the first refractive index. A transparent conductive polymer layer is applied over the diffusion layer. The conductive polymer layer has a third refractive index equal to the first refractive index. The conductive polymer layer forms a common electrode. In a particular embodiment, a bottom support plate opposes the top support plate. A pixel is positioned between the top support plate and the bottom support plate. A reflective layer is positioned on the bottom support plate within the electrowetting pixel. An oil and an electrolyte fluid that is immiscible with the oil is in the electrowetting pixel. The electrolyte fluid contacts the common electrode. An electrode layer is positioned over the bottom support plate. The electrode layer or a pixel electrode is coupled to the common electrode for creating a voltage differential between the electrode layer and the common electrode to cause relative displacement of the oil and the electrolyte fluid to expose at least a portion of the reflective layer.

Figure 5:
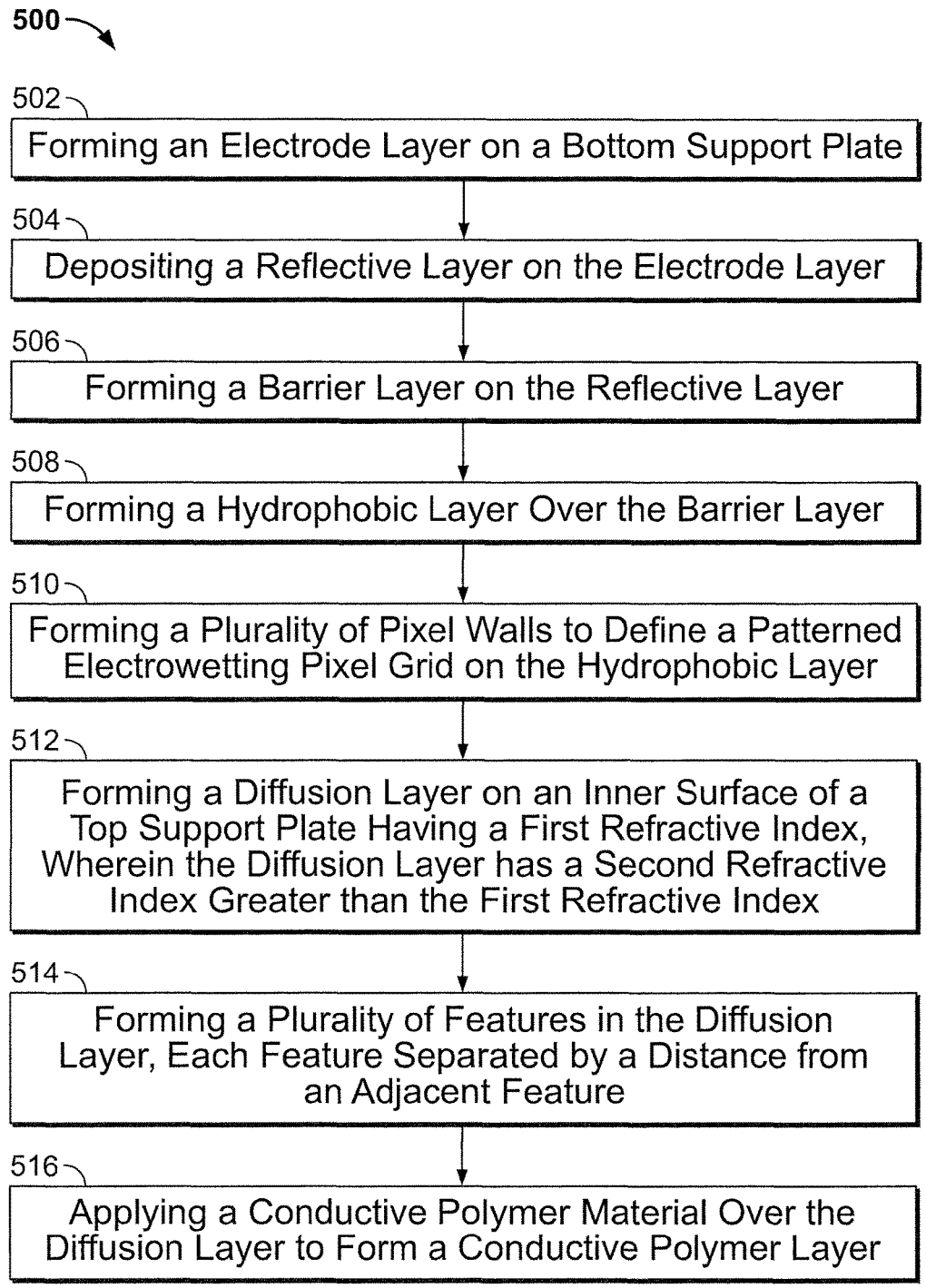
FIG. 5 illustrates an example method for fabricating an electrowetting display device, according to various embodiments.

FIG. 5 is a flow diagram of an example method 500 for fabricating an electrowetting display device, such as electrowetting display device 100 as shown in FIGS. 1-4. Though claimed subject matter is not limited in this respect, process 500 may be performed manually (e.g., by humans) and/or using automated equipment. At block 502, an electrode layer 110 is formed on first or bottom support plate 104. In this embodiment, electrode layer 110 is deposited on bottom support plate 104. Additional layers may be positioned between electrode layer 110 and bottom support plate 104. In one embodiment, a multilayer stack including a first conductive layer is formed on bottom support plate 104. In this embodiment, the first conductive layer is indium tin oxide (ITO), although in alternative embodiments the first conductive layer may be another suitable material. Deposition techniques include, for example, chemical vapor deposition (CVD), physical vapor deposition (PVD), molecular beam epitaxy (MBE), and sputtering. The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and sputtering, for example.

Reflective layer 116 is then deposited 504 on electrode layer 110. In this embodiment, reflective layer 116 is positioned with respect to or within a respective display surface area 106 of each electrowetting pixel 102. This process forms reflective layer 116 as shown in FIGS. 1 and 2. A suitable barrier layer 120 is formed 506 on reflective layer 116. A hydrophobic layer, such as an AF 1600® layer, (e.g., hydrophobic layer 122, shown in FIGS. 1 and 2) is formed 508 over barrier layer 120. At block 510, a plurality of pixel walls 108 are formed to define a patterned electrowetting pixel grid 101 on hydrophobic layer 122. In one embodiment, pixel walls 108 include a photoresist material such as, for example, epoxy-based negative photoresist SU-8. The formed patterned electrowetting pixel grid 101 includes a plurality of rows and a plurality of columns that form an array of electrowetting pixels, such as shown in FIG. 3, including a plurality of electrowetting pixels 102 having a suitable width and length.

In one embodiment, a photoresist material is deposited over the multilayer stack and at block 510 the photoresist material is exposed to a diffractive dark field mask to form pixel walls 108. In alternative embodiments, these structures may be printed using suitable methods other than photolithography, including, without limitation, direct writing and electron beam lithography (EBL). The pixel walls 108 are cured and fused together and the uncured portions of the photoresist material are removed to leave pixel wall 108.

At block 512, a diffusion layer 142 is formed on an inner surface 144 of a second or top support plate 114. In the example embodiment, diffusion layer 142 is deposited on top support plate 114 having a first refractive index. In this embodiment, diffusion layer 142 has a second refractive index greater than the first refractive index. For example, diffusion layer 142 may be formed of ITO having a refractive index of 2.0. A plurality of features are formed 514 in diffusion layer 142, wherein each feature of the plurality of features are separated by a distance from an adjacent feature of the plurality of features. The plurality of features are distributed, either randomly or in order, e.g., patterned in a predetermined pattern, within the diffusion layer to form the diffusion layer having a distribution of features greater than 70%. In an example embodiment, diffusion layer 142 is patterned using a diffractive mask to form 514 a plurality of features 148 separated by voids 150 defined through diffusion layer 142. In one embodiment, a photoresist material is deposited on top support plate 114 and the photoresist material is exposed to a diffractive dark field mask to form features 148. In alternative embodiments, features 148 may be printed using suitable methods other than photolithography, including, without limitation, direct writing and electron beam lithography (EBL). The features 148 are cured and the uncured portions of the photoresist material are removed to leave features 148 and voids 150. For example, at block 514, diffusion layer 142 is patterned to define a predetermined pattern of features 148 separated by voids 150 on top support plate 114. In certain embodiments, forming a plurality of features, e.g., patterning the diffusion layer using a diffractive mask to form a plurality of features separated by voids defined through the diffusion layer, includes tuning one or more parameters of the plurality of features to control at least one of the following: a degree of light diffusion, a direction of light diffusion, and a transmittance of an internal diffuser. Further, forming a plurality of features, e.g., patterning the diffusion layer using a diffractive mask to form a plurality of features separated by voids defined through the diffusion layer, may include tuning one or more of the following parameters of the plurality of features to provide a predetermined diffusion characteristic of the diffusion layer: a shape of each feature, one or more dimensions of each feature in a plane of the diffusion layer, and a density of the plurality of features within the diffusion layer.

In one embodiment, diffusion layer 142 includes a photoresist material such as, for example, epoxy-based negative photoresist SU-8. The formed patterned features 148 have a suitable shape and density. A photoresist material is deposited over top support plate 114 and at block 514 the photoresist material is exposed to a diffractive dark field mask to form features 148. In alternative embodiments, these structures may be printed using suitable methods other than photolithography, including, without limitation, direct writing and electron beam lithography (EBL). Features 148 are cured and the uncured portions of the photoresist material are removed to leave the plurality of features 148 separated by one or more voids 150 defined through diffusion layer 142. After features 148 are formed, a transparent conductive material, e.g., a conductive polymer material, is applied 516 over, e.g., deposited on, diffusion layer 142 to form conductive polymer layer 146 providing common electrode 112. In one embodiment, applying a transparent conductive polymer material over the diffusion layer to form a common electrode includes applying a conductive polymer material comprising one of the following: polyacetylene (PAC), polypyrrole (PPY), polythiophene (PT) or polyanilines (PANT) on the diffusion layer.

Figure 6:
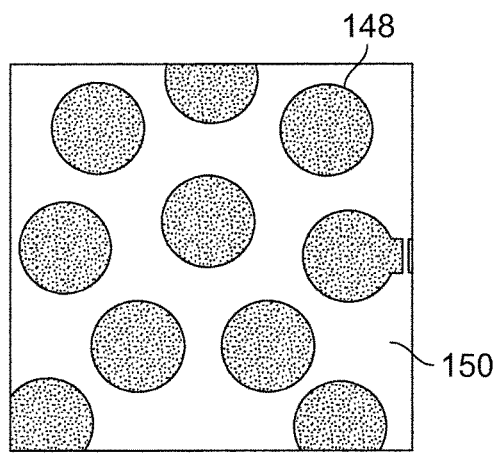
FIG. 6 illustrates an example patterned diffusion layer of the electrowetting display device of FIG. 3, according to various embodiments.
Figure 7:
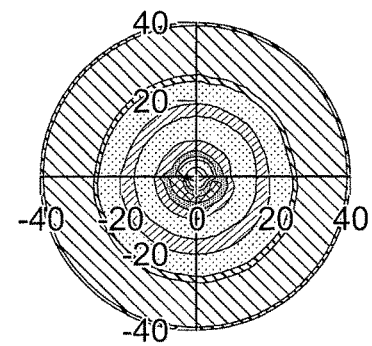
FIG. 7 illustrates a corresponding diffusion pattern for the patterned diffusion layer of FIG. 6.
Figure 8:
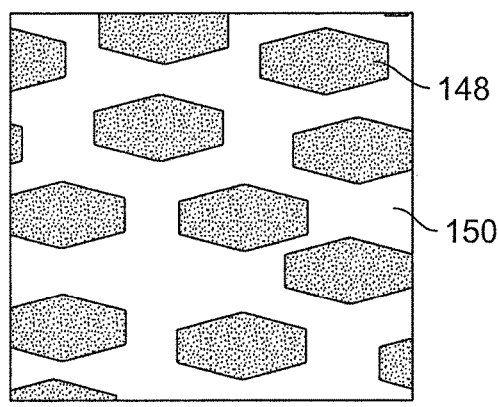
FIG. 8 illustrates an example patterned diffusion layer of the electrowetting display device of FIG. 3, according to various embodiments.
Figure 9:
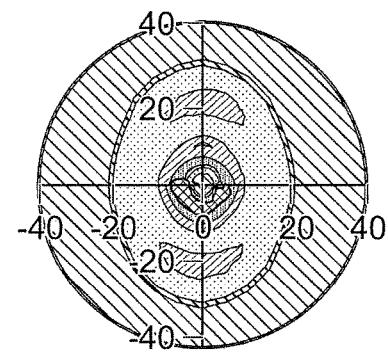
FIG. 9 illustrates a corresponding diffusion pattern for the patterned diffusion layer of FIG. 8.
Figure 10:
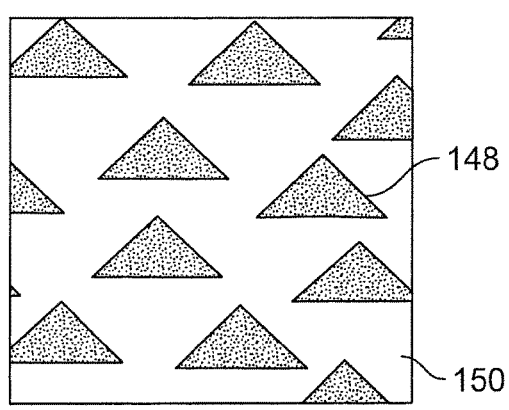
FIG. 10 illustrates an example patterned diffusion layer of the electrowetting display device of FIG. 3, according to various embodiments.
Figure 11:
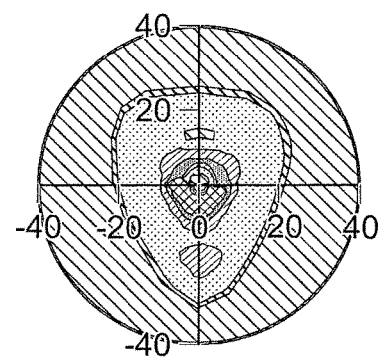
FIG. 11 illustrates a corresponding diffusion pattern for the patterned diffusion layer of FIG. 10.
Figure 12A:
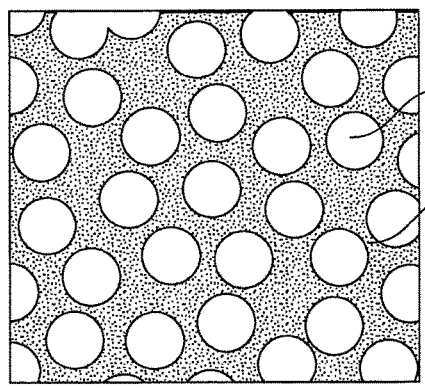
FIGS. 12A-14B illustrate suitable patterns for an ITO layer forming the diffusion layer of the electrowetting display device of FIG. 3, according to various embodiments.
Figure 12B:
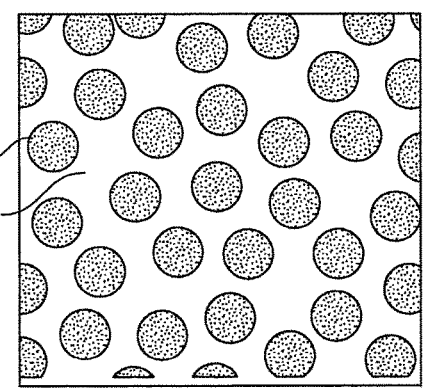
Figure 13A:
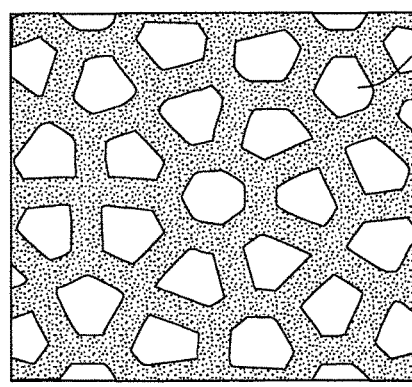
Figure 13B:
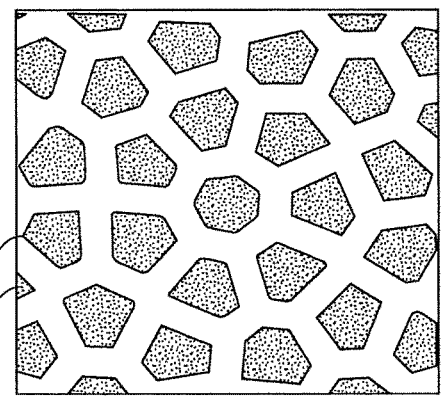

Referring further to FIGS. 6-11, in certain embodiments, within a restriction of a minimum size, e.g., 3 micrometers, for features 148 of diffusion layer 142, features 148 can be placed randomly on top support plate 114 and conductive polymer layer 146, having a refractive index the same or similar to the refractive indices of glass top support plate 114 and second fluid 132, is applied over diffusion layer 142 to provide internal diffusion. Referring further to FIGS. 6-11, the degree of light diffusion, a direction of light diffusion, and/or a transmittance of an internal diffuser can be controlled by tuning one or more parameters while patterning diffusion layer 142 to form features 148 and voids 150. As shown in FIGS. 6, 8, and 10, a shape of features 148, e.g., a circular, square, hexagonal or other suitable polygonal shape, one or more dimensions of features 148, e.g., a width and/or a length of feature 148 in a plane of diffusion layer 142, and/or a density of features 148 within diffusion layer 142 can be tuned to predicatively control the diffusion characteristics of diffusion layer 142 and conductive polymer layer 146. For example, features 148 having a circular cross-sectional shape, as shown in FIG. 6, will have a corresponding diffusion pattern as shown in FIG. 7. Similarly, features 148 having an oval cross-sectional shape, as shown in FIG. 8, will have a corresponding diffusion pattern as shown in FIG. 9 and features 148 having a triangular cross-sectional shape, as shown in FIG. 10, will have a corresponding diffusion pattern as shown in FIG. 11.

Figure 14A:
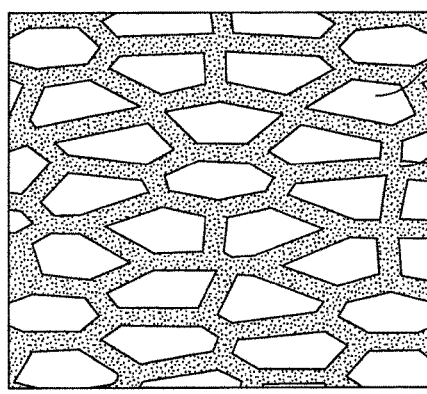
Figure 14B:
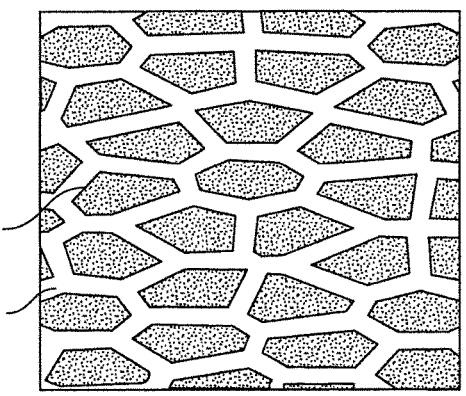

FIGS. 12A-14B show suitable patterns for an ITO layer forming diffusion layer 142 to provide desired diffusion characteristics within electrowetting display device 100. Within each electrowetting pixel 102, a distribution of features 148 in diffusion layer 142 may be random, ordered, e.g., patterned, or a combination of random and ordered. Moreover, a portion of electrowetting pixel 102 at which first fluid 130 is displaced, such as shown in FIGS. 2 and 4, may not include any features 148. For example, in FIGS. 12A, 13A, and 14A, the patterned features 148 of diffusion layer 142 are shown in white. Depending on the requirements for diffusiveness, a reverse pattern, as shown in FIGS. 12B, 13B, and 14B, can be applied having interconnected features 148 with voids 150.

First fluid 130 and second fluid 132 (e.g., the oil and the electrolyte solution) can be disposed within electrowetting pixels 102 of electrowetting display device 100. Top support plate 114 is then coupled to bottom support plate 104 to fabricate electrowetting display device 100. As shown in FIGS. 1 and 2 for example, top support plate 114 is opposite bottom support plate 104, forming opposing outer surfaces of electrowetting display device 100.

In one embodiment, a method for fabricating an electrowetting display device includes applying, e.g., depositing, a diffusion layer on a first support plate, e.g., a top support plate. In this embodiment, the support plate has a first refractive index and the diffusion layer has a second refractive index greater than the first refractive index. The diffusion layer is patterned through a diffractive mask to form a plurality of features separated by voids defined through the diffusion layer. A transparent conductive material is applied over, e.g., deposited on, the diffusion layer to form a transparent conductive layer.

In a certain embodiment, an electrode layer is formed on a second support plate, e.g., a bottom support plate, opposing the first support plate. A reflective layer is positioned over, e.g., deposited on, the electrode layer. A plurality of pixel walls are formed over the reflective layer. The plurality of pixel walls are associated with a plurality of electrowetting pixels. In this embodiment, the reflective layer is positioned with respect to or within a respective display surface area of each electrowetting pixel of the plurality of electrowetting pixels.

Figure 15:
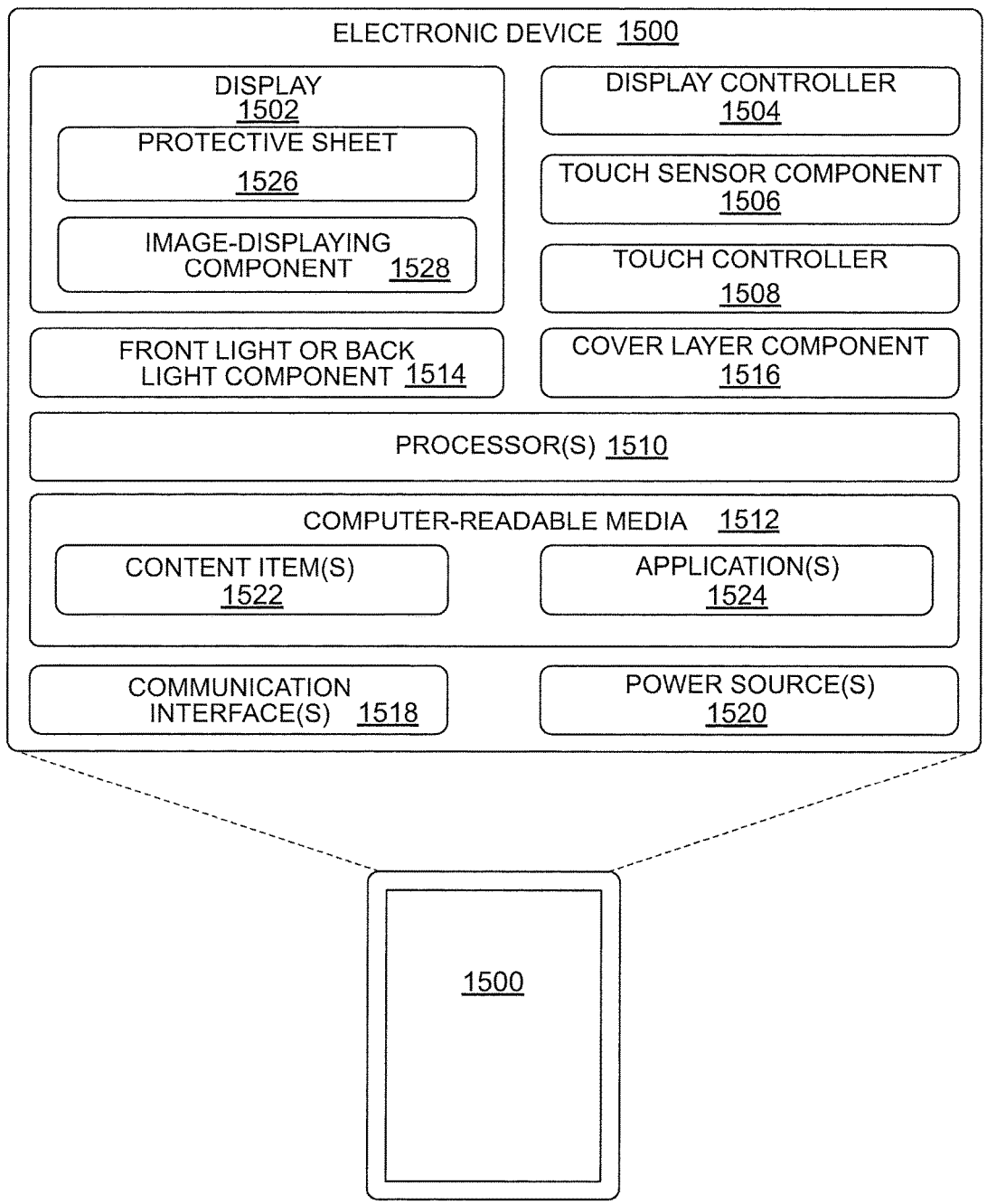
FIG. 15 illustrates an example electronic device that may incorporate an electrowetting display device, according to various embodiments.

FIG. 15 illustrates an example electronic device 1500 that may incorporate any of the display devices discussed above. Electronic device 1500 may comprise any type of electronic device having a display. For instance, electronic device 1500 may be a mobile electronic device (e.g., an electronic book reader, a tablet computing device, a laptop computer, a smart phone or other multifunction communication device, a portable digital assistant, a wearable computing device, or an automotive display). Alternatively, electronic device 1500 may be a non-mobile electronic device (e.g., a computer display or a television). In addition, while FIG. 15 illustrates several example components of electronic device 1500, it is to be appreciated that electronic device 1500 may also include other conventional components, such as an operating system, system busses, input/output components, and the like. Further, in other embodiments, such as in the case of a television or computer monitor, electronic device 1500 may only include a subset of the components illustrated.

Regardless of the specific implementation of electronic device 1500, electronic device 1500 includes a display 1502 and a corresponding display controller 1504. Display 1502 may represent a reflective or transmissive display in some instances or, alternatively, a transflective display (partially transmissive and partially reflective).

In one embodiment, display 1502 comprises an electrowetting display that employs an applied voltage to change the surface tension of a fluid in relation to a surface. For example, such an electrowetting display may include the array of pixels 102 illustrated in FIG. 3, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of display 1502 are independently activated, display 1502 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, display 1502 may represent a backlit display, examples of which are mentioned above.

In addition to including display 1502, FIG. 15 illustrates that some examples of electronic device 1500 may include a touch sensor component 1506 and a touch controller 1508. In some instances, at least one touch sensor component 1506 resides with, or is stacked on, display 1502 to form a touch-sensitive display. Thus, display 1502 may be capable of both accepting user touch input and rendering content in response to or corresponding to the touch input. As several examples, touch sensor component 1506 may comprise a capacitive touch sensor, a force sensitive resistance (FSR), an interpolating force sensitive resistance (IFSR) sensor, or any other type of touch sensor. In some instances, touch sensor component 1506 is capable of detecting touches as well as determining an amount of pressure or force of these touches.

FIG. 15 further illustrates that electronic device 1500 may include one or more processors 1510 and one or more computer-readable media 1512, as well as a front light component 1514 (which may alternatively be a backlight component in the case of a backlit display) for lighting display 1502, a cover layer component 1516, such as a cover glass or cover sheet, one or more communication interfaces 1518 and one or more power sources 1520. The communication interfaces 1518 may support both wired and wireless connection to various networks, such as cellular networks, radio, WiFi networks, short range networks (e.g., Bluetooth®), and infrared (IR) networks, for example.

Depending on the configuration of electronic device 1500, computer-readable media 1512 (and other computer-readable media described throughout) is an example of computer storage media and may include volatile and nonvolatile memory. Thus, computer-readable media 1512 may include, without limitation, RAM, ROM, EEPROM, flash memory, and/or other memory technology, and/or any other suitable medium that may be used to store computer-readable instructions, programs, applications, media items, and/or data which may be accessed by electronic device 1500.

Computer-readable media 1512 may be used to store any number of functional components that are executable on processor 1510, as well as content items 1522 and applications 1524. Thus, computer-readable media 1512 may include an operating system and a storage database to store one or more content items 1522, such as eBooks, audio books, songs, videos, still images, and the like. Computer-readable media 1512 of electronic device 1500 may also store one or more content presentation applications to render content items on electronic device 1500. These content presentation applications may be implemented as various applications 1524 depending upon content items 1522. For instance, the content presentation application may be an electronic book reader application for rending textual electronic books, an audio player for playing audio books or songs, or a video player for playing video.

In some instances, electronic device 1500 may couple to a cover (not illustrated in FIG. 15) to protect the display 1502 (and other components in the display stack or display assembly) of electronic device 1500. In one example, the cover may include a back flap that covers a back portion of electronic device 1500 and a front flap that covers display 1502 and the other components in the stack. Electronic device 1500 and/or the cover may include a sensor (e.g., a Hall effect sensor) to detect whether the cover is open (i.e., if the front flap is not atop display 1502 and other components). The sensor may send a signal to front light component 1514 if the cover is open and, in response, front light component 1514 may illuminate display 1502. If the cover is closed, meanwhile, front light component 1514 may receive a signal indicating that the cover has closed and, in response, front light component 1514 may turn off.

Furthermore, the amount of light emitted by front light component 1514 may vary. For instance, upon a user opening the cover, the light from the front light may gradually increase to its full illumination. In some instances, electronic device 1500 includes an ambient light sensor (not illustrated in FIG. 15) and the amount of illumination of front light component 1514 may be based at least in part on the amount of ambient light detected by the ambient light sensor. For example, front light component 1514 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 1502 may vary depending on whether front light component 1514 is on or off, or based on the amount of light provided by front light component 1514. For instance, electronic device 1500 may implement a larger default font or a greater contrast when the light is off compared to when the light is on. In some embodiments, electronic device 1500 maintains, if the light is on, a contrast ratio for display 1502 that is within a certain defined percentage of the contrast ratio if the light is off.

As described above, touch sensor component 1506 may comprise a capacitive touch sensor that resides atop display 1502. In some examples, touch sensor component 1506 may be formed on or integrated with cover layer component 1516. In other examples, touch sensor component 1506 may be a separate component in the stack of the display assembly. Front light component 1514 may reside atop or below touch sensor component 1506. In some instances, either touch sensor component 1506 or front light component 1514 is coupled to a top surface of a protective sheet 1526 of display 1502. As one example, front light component 1514 may include a lightguide sheet and a light source (not illustrated in FIG. 15). The lightguide sheet may comprise a substrate (e.g., a transparent thermoplastic such as PMMA or other acrylic), a layer of lacquer and multiple grating elements formed in the layer of lacquer that function to propagate light from the light source towards display 1502; thus, illuminating display 1502.

Cover layer component 1516 may include a transparent substrate or sheet having an outer layer that functions to reduce at least one of glare or reflection of ambient light incident on electronic device 1500. In some instances, cover layer component 1516 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, protective sheet 1526 may include a similar UV-cured hard coating on the outer surface. Cover layer component 1516 may couple to another component or to protective sheet 1526 of display 1502. Cover layer component 1516 may, in some instances, also include a UV filter, a UV-absorbing dye, or the like, for protecting components lower in the stack from UV light incident on electronic device 1500. In still other examples, cover layer component 1516 may include a sheet of high-strength glass having an antiglare and/or antireflective coating.

Display 1502 includes protective sheet 1526 overlying an image-displaying component 1528. For example, display 1502 may be preassembled to have protective sheet 1526 as an outer surface on the upper or image-viewing side of display 1502. Accordingly, protective sheet 1526 may be integral with and may overlay image-displaying component 1528. Protective sheet 1526 may be optically transparent to enable a user to view, through protective sheet 1526, an image presented on image-displaying component 1528 of display 1502.

In some examples, protective sheet 1526 may be a transparent polymer film in the range of 25 to 200 micrometers in thickness. As several examples, protective sheet 1526 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 1526 may include a coating, such as the hard coating described above. For instance, the hard coating may be applied to the outer surface of protective sheet 1526 before or after assembly of protective sheet 1526 with image-displaying component 1528 of display 1502. In some examples, the hard coating may include a photoinitiator or other reactive species in its composition, such as for curing the hard coating on protective sheet 1526. Furthermore, in some examples, protective sheet 1526 may be dyed with a UV-light-absorbing dye, or may be treated with other UV-absorbing treatment. For example, protective sheet 1526 may be treated to have a specified UV cutoff such that UV light below a cutoff or threshold wavelength is at least partially absorbed by protective sheet 1526, thereby protecting image-displaying component 1528 from UV light.

According to some embodiments herein, one or more of the components discussed above may be coupled to display 1502 using fluid optically-clear adhesive (LOCA). For example, the light guide portion of front light component 1514 may be coupled to display 1502 by placing LOCA on the outer or upper surface of protective sheet 1526. If the LOCA reaches the corner(s) and/or at least a portion of the perimeter of protective sheet 1526, UV-curing may be performed on the LOCA at the corners and/or the portion of the perimeter. Thereafter, the remaining LOCA may be UV-cured and front light component 1514 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 1514. In other embodiments, the LOCA may be placed near a center of protective sheet 1526, and pressed outwards towards a perimeter of the top surface of protective sheet 1526 by placing front light component 1514 on top of the LOCA. The LOCA may then be cured by directing UV light through front light component 1514. As discussed above, and as discussed additionally below, various techniques, such as surface treatment of the protective sheet, may be used to prevent discoloration of the LOCA and/or protective sheet 1526.

While FIG. 15 illustrates a few example components, electronic device 1500 may have additional features or functionality. For example, electronic device 1500 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 1500 may reside remotely from electronic device 1500 in some implementations. In these implementations, electronic device 1500 may utilize communication interfaces 1518 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
   a first support plate and a second support plate, the second support plate having a first refractive index;
   an electrowetting pixel positioned between the first support plate and the second support plate;
   a reflective layer positioned on the first support plate within the electrowetting pixel;
   an oil and an electrolyte fluid that is immiscible with the oil, the oil and the electrolyte fluid in the electrowetting pixel;
   a diffusion layer on a first surface of the second support plate, the diffusion layer comprising an indium tin oxide (ITO) layer forming a plurality of features, each feature of the plurality of features having a second refractive index greater than the first refractive index and each feature of the plurality of features being separated by a distance from an adjacent feature of the plurality of features;
   a conductive polymer layer over the diffusion layer, the conductive polymer layer having a third refractive index equal to the first refractive index, the conductive polymer layer providing a common electrode contacting the electrolyte fluid; and
   an electrode layer positioned over the first support plate for creating, in conjunction with the common electrode, a voltage differential between the electrode layer and the common electrode to cause relative displacement of the oil and the electrolyte fluid to expose at least a portion of the reflective layer.

2. The electrowetting display device of claim 1, wherein within the electrowetting pixel, the diffusion layer has a distribution of features greater than 70% and at least one of: a shape of each feature, one or more dimensions of each feature, or a distribution of the plurality of features within the diffusion layer controls a diffusion characteristic of the diffusion layer.

3. A display device, comprising:
   a bottom support plate;
   a top support plate opposing the bottom support plate, the top support plate having a first refractive index;
   a pixel positioned between the top support plate and the bottom support plate;
   a diffusion layer on a first surface of the top support plate, the diffusion layer comprising a plurality of features, each feature of the plurality of features having a second refractive index greater than the first refractive index;
   a transparent conductive polymer layer over the diffusion layer, the transparent conductive polymer layer having a third refractive index equal to the first refractive index, the transparent conductive polymer layer providing a common electrode; and
   an oil and an electrolyte solution that is immiscible with the oil, the oil and the electrolyte solution in the pixel, the electrolyte solution contacting the common electrode.

4. The display device of claim 3, further comprising:
   a reflective layer positioned on the bottom support plate within the pixel;
   and
   an electrode layer positioned over the bottom support plate, the electrode layer coupled to the common electrode for creating a voltage differential between the electrode layer and the common electrode to cause relative displacement of the oil and the electrolyte solution to expose at least a portion of the reflective layer.

5. The display device of claim 3, wherein, within the pixel, the diffusion layer has a distribution of features greater than 70%.

6. The display device of claim 3, wherein at least one of a degree of light diffusion, a direction of light diffusion, or a transmittance of an internal diffuser is controlled by tuning one or more parameters of the plurality of features.

7. The display device of claim 6, wherein the one or more parameters include: a shape of each feature, one or more dimensions of each feature in a plane of the diffusion layer, and a density of the plurality of features within the diffusion layer.

8. The display device of claim 3, wherein a feature of the plurality of features has one of: a circular cross-sectional shape, an oval cross-sectional shape, or a triangular cross-sectional shape.

9. The display device of claim 3, wherein each feature is separated by a distance from an adjacent feature of the plurality of features.

10. The display device of claim 3, wherein the diffusion layer has a thickness of about 100 nanometers to about 300 nanometers.

11. The display device of claim 3, wherein the transparent conductive layer has a thickness of about 300 nanometers to about 500 nanometers.

12. The display device of claim 3, wherein the diffusion layer comprises indium tin oxide having the second refractive index of 2.0 and the transparent conductive polymer layer has the third refractive index of 1.5.

13. The display device of claim 3, where the conductive polymer layer comprises one of the following: polyacetylene (PAC), polypyrrole (PPY), polythiophene (PT) or polyanilines (PANI).

14. A display device, comprising:
a support plate having a first refractive index;
a diffusion layer on a first surface of the support plate, the diffusion layer comprising a plurality of features, each feature of the plurality of features having a second refractive index greater than the first refractive index; and
a transparent conductive polymer layer over the diffusion layer, the transparent conductive polymer layer having a third refractive index equal to the first refractive index, the transparent conductive polymer layer providing a common electrode, wherein the second refractive index is at least 2.0 and each of the first refractive index and the third refractive index is less than 2.0.

15. A display device, comprising:
a support plate having a first refractive index;
a color filter layer having a first surface and a second surface opposite the first surface, the first surface of the color filter layer contacting the first surface of the support plate;
a diffusion layer on the second surface of the color filter layer, the diffusion layer comprising a plurality of features, each feature of the plurality of features having a second refractive index greater than the first refractive index; and
a transparent conductive polymer layer over the diffusion layer, the transparent conductive polymer layer having a third refractive index equal to the first refractive index, the transparent conductive polymer layer providing a common electrode.

16. A method for fabricating an electrowetting display device, the method comprising:
depositing a diffusion layer on a first support plate, the first support plate having a first refractive index and the diffusion layer having a second refractive index greater than the first refractive index;
forming a plurality of features in the diffusion layer, each feature of the plurality of features separated by a distance from an adjacent feature of the plurality of features;
applying a transparent conductive polymer material over the diffusion layer to form a common electrode;
forming a pixel between the first support plate and the second support plate;
disposing an oil and an electrolyte solution that is immiscible with the oil in the pixel, the electrolyte solution contacting the common electrode; and
coupling the first support plate to a second support plate to form the electrowetting display device.

17. The method of claim 16, wherein forming a plurality of features in the diffusion layer comprises tuning one or more parameters of the plurality of features to control one of the following: a degree of light diffusion, a direction of light diffusion, or a transmittance of an internal diffuser.

18. The method of claim 16, wherein forming a plurality of features in the diffusion layer comprises tuning one of the following parameters of the plurality of features to provide a predetermined diffusion characteristic of the diffusion layer: a shape of each feature, one or more dimensions of each feature in a plane of the diffusion layer, or a density of the plurality of features within the diffusion layer.

19. The method of claim 16, wherein applying a transparent conductive polymer material over the diffusion layer to form a common electrode comprises applying a conductive polymer material comprising one of the following: polyacetylene (PAC), polypyrrole (PPY), polythiophene (PT) or polyanilines (PANI) on the diffusion layer.

20. The method of claim 16, wherein forming a plurality of features in the diffusion layer comprises distributing the plurality of features within the diffusion layer to form the diffusion layer having a distribution of features greater than 70%.

* * * * *